United States Patent [19]

Anderson et al.

[11] 4,408,720

[45] Oct. 11, 1983

[54] DEMOUNTABLE WHEELED LIQUID SPRAYER

[75] Inventors: Donald R. Anderson; Iven R. Norstrud; John H. Threlkeld, all of Britt, Iowa

[73] Assignee: Britt Tech Corporation, Britt, Iowa

[21] Appl. No.: 225,196

[22] Filed: Jan. 15, 1981

[51] Int. Cl.³ .............................................. B05B 9/00
[52] U.S. Cl. .................................. 239/149; 239/222; 239/683
[58] Field of Search ................... 239/149, 7, 222, 223, 239/224, 685, 687, 659, 663, 684; 222/324

[56] References Cited

U.S. PATENT DOCUMENTS

| | | |
|---|---|---|
| 2,723,860 | 11/1955 | Weeks . |
| 3,648,935 | 3/1972 | Waldrum . |
| 3,719,168 | 3/1973 | Kazee .............................. 239/222 |
| 3,856,211 | 12/1974 | Williams .......................... 239/685 |
| 3,993,225 | 11/1976 | Manni . |
| 3,994,438 | 11/1976 | Farmery . |
| 4,006,858 | 2/1977 | Farmery . |
| 4,185,782 | 1/1980 | Belrose . |
| 4,234,131 | 11/1980 | Baker .............................. 239/685 |

Primary Examiner—James B. Marbert
Attorney, Agent, or Firm—Schroeder, Siegfried, Vidas & Arrett

[57] ABSTRACT

A demountable wheeled liquid sprayer comprised of an elongated handle having an angulated forward end portion supporting a battery driven electric motor with a depending drive shaft rotatably mounting a cup having inwardly and upwardly extending sidewalls with circumferentially spaced openings extending downwardly and outwardly therethrough around the periphery of its bottom. The handle is detachably mounted on a small two-wheeled frame and supports a removable and disposable liquid container which discharges its contents into the cup through conduit means and an associated valve. Valve control means is mounted on the handle and simultaneously opens the valve while activating the motor, or closes the valve while deactivating the motor. The handle and described sprayer may be detached, transported and used manually absent the wheeled frame.

17 Claims, 6 Drawing Figures

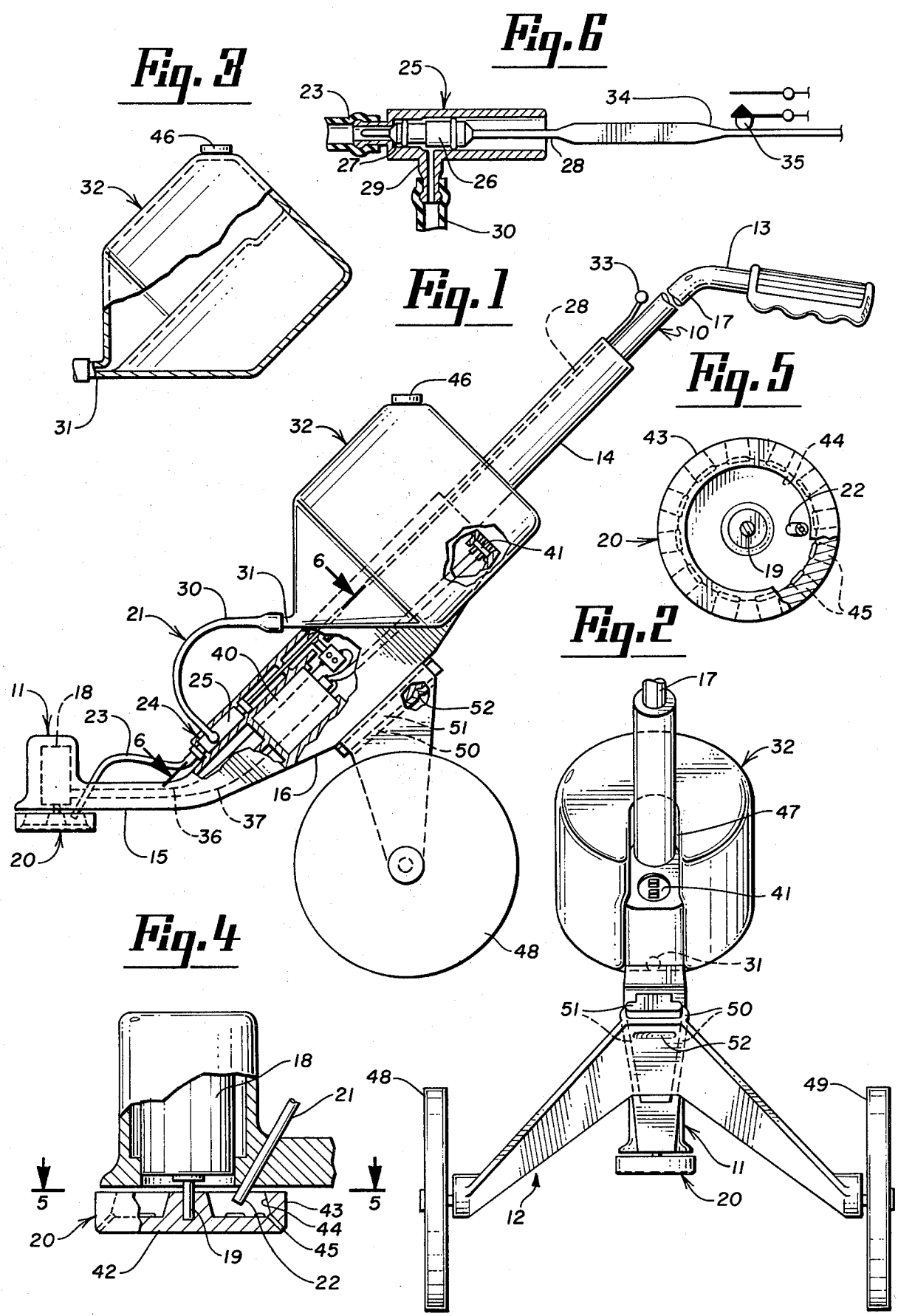

DEMOUNTABLE WHEELED LIQUID SPRAYER

BACKGROUND OF PRIOR ART

Various types of spreaders and sprayers for liquid pesticides, herbicides, fertilizers and fungicides have heretofore been known. Most such devices utilize a rapidly rotating disc, bladed or otherwise, to fling or broadcast the material to be spread and are unsatisfactory in that it is difficult to control the size of the droplets and the extent and uniformity of distribution thereof, particularly in breezes or winds. Also, most are relatively complicated and expensive to manufacture if they are of the type which perform in a somewhat satisfactory manner.

BRIEF SUMMARY OF THE INVENTION

The liquid is spread over a well defined diameter approximating 6–7 feet in diameter in small droplets of uniform size at an elevation of only six inches, thereby minimizing the effect of wind and ensuring uniform application over a controlled well defined area. The spray is directed downwardly and outwardly to the surface therebelow. This is accomplished with a rapidly rotating motor-driven cup having sidewalls extending inwardly and upwardly from its bottom, and circumferentially and regularly spaced openings in said sidewalls which extend outwardly and downwardly from the periphery of the bottom wall to the exterior. The cup is gravity-fed and is carried by the forward and lower end of a handle which carries a removable and disposable liquid container, as well as a battery and control means which simultaneously closes a switch to the motor and opens a conduit valve to cause the liquid to be discharged upon the cup bottom at a controlled rate. Correspondingly, the control opens the switch when it is closes the conduit valve. The entire unit, as described, is detachably mounted upon a small two-wheeled frame to support the cup about six inches above the ground or to permit the unit to be manually transported and/or utilized in applying such liquids without the benefit of the support of the frame.

BRIEF DESCRIPTION OF THE DRAWINGS

A detailed description of one preferred embodiment of the demountable wheeled liquid sprayer is hereafter described with specific reference being made to the drawings in which:

FIG. 1 is a schematic side elevational view of our sprayer in simplified form;

FIG. 2 is a rear elevational view thereof;

FIG. 3 is a side elevational view of the liquid container with parts broken away;

FIG. 4 is a side elevational view on an enlarged scale of the distributing head of the sprayer, with parts broken away;

FIG. 5 is a sectional view taken along line 5—5 of FIG. 1; and

FIG. 6 is an auxiliary sectional view along line 6—6 of FIG. 1, on an enlarged scale.

DETAILED DESCRIPTION OF THE INVENTION

The preferred embodiment of our invention, as shown in FIGS. 1-6, inclusive, is comprised of a handle member 10, a liquid spreader or sprayer 11, and a detachable two-wheeled frame 12. The handle member 10 consists of a tubular rear or upper end portion 13, an intermediate portion 14, and a forward or lower end portion 15, the latter being angulated relative to the overall length thereof. As shown, the forward end portion 15 and intermediate portion 14 are in the form of a molded split casing 16 which is fixedly secured in any suitable manner to a tubular metal member 17.

Mounted on the angulated end section of the forward end portion 15 is an electric motor 18 having a depending substantially vertical drive shaft 19 which rotatably mounts a cup member 20 for rapid rotation therewith. Conduit means 21 discharges the liquid to be spread or sprayed through the discharge spout or tube 22 into the confines of the cup member 20. Conduit or tube 23 connects the spout 22 with valve means 24 which is interposed within the conduit means 21 to control the flow of liquid by gravity therethrough.

Valve means 24 includes a connector 25 having a valve element 26 engaging valve seat 27 and slidable upwardly and downwardly by control cable 28 between open and closed positions, respectively. Feed nozzle 29 extends into supply conduit 30 which extends to the discharge outlet 31 of liquid supply container 32 which is carried by the medial or intermediate portions 14 of the handle.

The control cable 28, as shown, is located within the confines of the handle member 10 and is provided with a control loop 33 at its upper end by means of which the cable 28 is shifted longitudinally to move the valve element 26, and by means of which the motor 18 is activated or deactivated, as hereinafter described.

As shown, the control cable 28 includes an enlargement or cam 34 disposed adjacent switch 35 which is carried by the handle adjacent said cam and is interposed within an electrical circuit established by lead lines 36, 37, 38. These lead lines run between the motor 18, switch 35, and a two volt, five ampere lead acid rechargeable battery 40, such as the X-Cell battery sold by Gates Rubber Company, Denver, Colorado. As shown, the battery 40 is carried by the handle member and has a recharge receptacle 41 for recharging purposes. Longitudinal shifting of the control cable 28 and cam 34 causes switch 35 to be opened and closed simultaneously with closing and opening of the valve, respectively.

The cup 20 is mounted coaxially upon the lower end of drive shaft 19. As best shown in FIG. 4, the cup member 20 has a bottom wall 42 and upstanding side walls 43, the inner surface 44 of which extends upwardly and inwardly from the periphery of the bottom wall. A plurality, preferably six (6), of openings 45 are spaced evenly around the periphery of the bottom wall 42 and extend downwardly and outwardly from the periphery thereof through the side walls 43 and terminate at the lower outer edge portions thereof.

The container 31 is preferably of the disposable type and made of a relatively soft resilient plastic material. It has a filler opening provided with a cap 46 and a thin seal (not shown), the latter of which is perforated manually after the container is applied to the handle and elevated.

As shown in FIG. 2, the container is molded so as to have a radial slot 47 in its periphery which is slightly narrower than the diameter of the portion of the handle member to which it is applied so as to clamp thereupon. An abutment, not shown, is carried by the handle to abut the lower surface of the container and thereby prevent sliding of the same downwardly along the handle.

The wheels 48, 49 of the frame 12 are coaxially mounted thereon. The frame 12 is provided with an upwardly facing grooved receptacle 50 which tapers inwardly and downwardly. A matching and correspondingly shaped tongue member 51 is carried by the handle member 10 and fits thereinto to connect the two in readily detachable relation. A detente 52 in the receptacle holds the tongue in tight-fitting relation within the groove.

When the control 33 is pulled upwardly, the switch 35 is closed by cam 34 to start motor 18, and valve element 26 is moved to open position, whereupon liquid descends by gravity from container 32 and drips upon the upper surface of rapidly rotating cup 20. The liquid moves by centrifugal force outwardly and is dispensed outwardly and downwardly in tiny uniform droplets across a 6–7 foot diameter area upon the foliage and surface below. The diameter of wheels 48, 49 is preferably about 12 inches so the bottom of cup 20 is disposed approximately six inches above the ground.

The number and size of the openings 45 can be varied somewhat to control the type of application desired by utilizing interchanging cups. The droplet size is very uniform and there are no large droplets in the pattern nor fine misty droplets which tend to drift with the wind. The effect of any wind is considerably less than with pressuretype sprayers. The size of openings 45 which we prefer is 3/32–⅛ inch in diameter and they are preferably round. We rotate the cup within a range of 3000–7000 r.p.m. but we prefer 3000–4000 r.p.m. The size of the conduit means is ⅛ to ¼ inch in diameter which provides a rate of flow of up to 15 milliliters per second. Since the cup has a number of openings, the performance of our machine does not suffer materially in the event one or more should become plugged.

The spreader disclosed herein may be used in any reasonbly level or unobstructed area with wheeled frame 12 attached. If desired, the frame may be quickly and easily detached and the spreader may then be utilized manually to apply liquids such as herbicides on higher growing vegetation, flower beds and other more relatively inaccessible areas.

In considering this invention, it should be remembered that the present disclosure is illustrative only and the scope of the invention should be determined by the appended claims.

We claim:

1. A demountable wheeled liquid sprayer comprising:
   (a) a wheeled frame;
   (b) an elongated handle member detachably mounted at its medial portions in inclined supported relation upon said frame for ready detachment therefrom and having its lower end portion angulated and extending generally horizontally from said medial portions;
   (c) a powered motor mounted on said lower end portion and detachable therewith and having a vertically extending drive shaft;
   (d) an upwardly facing cup member mounted on said drive shaft in depending driven relation for rapid rotation therewith;
   (e) a liquid container mounted on the medial portions of said handle member in supported relation and having a liquid outlet;
   (f) conduit means connected to said container outlet and conveying liquid therefrom and discharging the same within the confines of said cup; and
   (g) said cup member having liquid containing walls through which a plurality of discharge openings extend to cause the liquid received therein to be dispersed in tiny droplets as it is received therewithin and as said cup member is rapidly rotated by said motor;
   (h) said handle member, motor, cup member, container, and conduit means being constructed and arranged for ready detachment as a unit from said frame and its wheels for hand-carried operation apart therefrom.

2. The structure defined in claim 1, and
   (h) said cup member having a bottom wall and having upstanding side walls with inner surfaces which extend upwardly and inwardly from the outer periphery of said bottom wall; and
   (i) said discharge openings of said cup member being arranged annularly around the periphery of said bottom wall and extending outwardly and downwardly therefrom to the exterior at the lower edge portions of the outer surface of said side walls.

3. The structure defined in claim 1, and
   (h) said cup member having a bottom wall and having upstanding side walls with inner surfaces which extend upwardly and inwardly from the outer periphery of said bottom wall;
   (i) said discharge openings of said cup member being annularly arranged around the periphery of said bottom wall and extending outwardly and downwardly therefrom to the exterior at the lower edge portions of the outer surface of said side walls; and
   (j) said conduit means terminating directly above said bottom wall of said cup member and discharging liquid from said container directly upon the upper surface of said bottom wall as it is rotated by said motor.

4. The structure defined in claim 1, and
   (h) said cup member having a bottom wall and having upstanding side walls with inner surfaces which extend upwardly and inwardly from the outer periphery of said bottom wall.

5. The structure defined in claim 1, and
   (h) valve means interposed within said conduit means and controlling the flow of liquid from said container therethrough to the interior of said cup member; and
   (i) control means mounted on said handle member and connected to said valve means in opening and closing controlling relation.

6. The structure defined in claim 1 wherein said frame is supported by a single pair of transversely spaced wheels mounted on a common axis.

7. The structure defined in claim 1, and
   (h) readily disconnectable attachment means extending between and connecting said handle member and said frame whereby said wheeled frame may be quickly and easily detached from said handle member for manual transport and use of the sprayer absent said frame.

8. The structure defined in claim 1 wherein said cup member has a bottom wall and said discharge openings are spaced circumferentially and regularly along the periphery thereof, said openings being approximately 3/32–⅛ inch in diameter.

9. The structure defined in claim 1 wherein said motor is an electric motor, and
   (h) battery means carried by said handle member and detachable therewith from said frame;

(i) electrical connector means connecting said battery means to said motor in electrical power-transmitting relation to drive the same;

(j) valve means interposed within said conduit means and controlling the flow of liquid therethrough from said container to the interior of said cup member;

(k) control means mounted on said handle member and connected to said valve means in opening and closing relation;

(l) switch means interposed within said electrical connector means for opening and closing an electrical circuit between said motor and said battery means;

(m) said switch means being located adjacent said control means in activated relation;

(n) said control means being constructed and arranged to engage and close said switch means when in opening relation with said valve means, and to open said switch means when in closing relation to said valve means, whereby said motor will rotate said cup member rapidly as said conduit means discharges liquid thereinto to effectively spread the latter.

10. The structure defined in claim 1, (h) said liquid container being generally U-shaped in cross-sectional configuration by virtue of a radially extending slot formed in the periphery thereof and being formed of a resilient material;

(i) the width of said slot being slightly less than the diameter of said handle member;

(j) medial portions of said handle member being received within said slot in tight fitting frictional engagement and supporting said container thereon; and (k) support means connected to said handle member for supporting said liquid container thereon in fixed supported relation.

11. A demountable wheeled liquid sprayer comprising:

(a) A wheeled frame;

(b) an elongated handle member having a forward and a rear end portion and being detachably mounted at its medial portions upon said frame adjacent its said forward end portion for ready detachment therefrom;

(c) a powered motor mounted on said forward end portion of said handle member and detachable therewith and having a depending drive shaft;

(d) an upwardly facing cup member mounted in coaxial relation on the lower end portion of said motor drive shaft in supported and driven relation for rapid rotation therewith about a generally vertical axis;

(e) a liquid container mounted on said handle member in supported relation and having a lower portion with a liquid outlet;

(f) conduit means connected to said container outlet and extending between said container and said cup member and conveying liquid from said container and discharging the same within the confines of said cup member;

(g) valve means interposed within said conduit means and controlling the flow of liquid therethrough from said container to the interior of said cup member;

(h) said cup member having liquid containing walls through which a plurality of circumferentially spaced openings extend outwardly to cause the liquid received within said cup member to be dispersed widely to all sides thereof in tiny droplets as it is received therewithin and as said cup member is rapidly rotated by said motor;

(i) said handle member, motor, cup member, container, conduit means and valve means being constructed and arranged for ready detachment as a unit from said frame and its wheels for hand-carried operation apart therefrom.

12. The structure defined in claim 11 wherein said cup member has a bottom wall and upstanding sidewalls having inner and outer annular surfaces, the inner annular surface of said sidewalls extending upwardly and inwardly from said bottom wall.

13. The structure defined in claim 11 wherein said cup member has a bottom wall and upstanding sidewalls having inner surfaces which extend upwardly and inwardly from the periphery of said bottom wall, and (i) said openings are spaced circumferentially along the periphery of said bottom wall and extend outwardly and downwardly from the inner surface of said bottom wall to the exterior at the lower edge portions of the outer surface of said sidewalls.

14. The structure defined in claim 11, wherein said motor is an electric motor, and (i) control means mounted on said handle member and connected to said valve means in opening and closing controlling relation;

(j) battery means carried by said handle member and detachable therewith from said frame;

(k) electrical connector means extending between said battery means and said motor in powertransmitting relation to drive the same;

(l) switch means interposed within said connector means for opening and closing an electrical circuit between said motor and said battery means;

(m) said switch means being carried by said handle member adjacent said control means in position to be activated thereby;

(n) said control means being constructed and arranged to engage and close said switch means when disposed in opening relation with said valve means, and to open said switch means when disposed in closing relation with said valve means, whereby said motor will be driven by said battery means and will rotate said cup member rapidly as said conduit means discharges liquid thereinto to effectively spread the same.

15. The structure defined in claim 11, and (i) readily connectable and disconnectable tongue and groove attachment means extending between said handle member and said frame whereby said wheeled frame may be quickly and easily detached from said handle member for manual transport and use of the sprayer absent said frame.

16. The structure defined in claim 14, wherein at least the major portion of said control means is disposed within the confines of said handle member.

17. A portable liquid sprayer comprising:

(a) an elongated handle member having a forward portion angulated relative to the length thereof and a rearward end portion;

(b) a powered motor mounted on said forward end portion of said handle member having a depending drive shaft extending generally normal to said forward end portion;

(c) an upwardly facing cup member mounted in coaxial relation upon the lower end portion of said drive shaft in supported and driven relation for rapid rotation therewith about a generally vertical axis when said handle member is oriented at approximately 45° relative to the ground;

(d) a liquid container mounted on said handle member in supported elevated relation with respect to said cup member and having a lower portion with a liquid outlet;

(e) conduit means connected to said container outlet and extending between said container and said cup member and conveying liquid from said container and discharging the same within the confines of said cup member;

(f) valve means interposed within said conduit means and controlling the flow of liquid therethrough from said container to the interior of said cup member; and (g) said cup member having a bottom wall and upstanding sidewalls, said sidewalls having inner surfaces which extend upwardly and inwardly from said bottom wall and having a plurality of circumferentially spaced discharge openings extending outwardly and downwardly therethrough from the periphery of said bottom wall to the lower outer edge portions of said sidewalls, said openings being constructed and arranged to cause the liquid received within said cup member to be dispersed widely to all sides thereof in tiny droplets as